June 6, 1967 C. LENZ 3,323,322

STORAGE AND FERMENTATION TANK FOR BEER

Filed Oct. 26, 1965

INVENTOR

Conrad Lenz

By: Low and Berman

Agents

United States Patent Office 3,323,322
Patented June 6, 1967

3,323,322
STORAGE AND FERMENTATION TANK
FOR BEER
Conrad Lenz, Annenhofstrasse 2, Freising,
Upper Bavaria, Germany
Filed Oct. 26, 1965, Ser. No. 505,273
Claims priority, application Germany, Apr. 6, 1965,
L 50,400
5 Claims. (Cl. 62—394)

This invention relates to tanks, and particularly to a tank for storing or fermenting beer at low temperature.

Storage and fermentation tanks for beer are commonly made of metal, particularly of commercially pure aluminum which is not corroded by beer and does not impair the quality of the beer stored or fermented therein. Beer is generally kept in such tanks during its secondary fermentation by which the beer is enriched with carbon dioxide, its aroma is improved, and its full cleansing is achieved. But the primary fermentation of the beer may also be carried out in tanks of the type which with this invention is concerned, and certain specialty beers are mainly prepared in such tanks.

Because of the relatively low strength of aluminum and because of its relatively high price, its is known to reinforce aluminum tanks by circumferential hoops or rings of steel or other strong metal which may be attached to supporting structure without risk of deforming the tank by concentration of stresses in a small area.

The temperature of stored or fermenting beer must be controlled, and cooling of the beer is necessary under most conditions. It is common practice to arrange several storage or fermentation tanks in a common hall equipped with air cooling apparatus, but it is evident that such an arrangement does not provide control of the temperature of individual tanks. Such individual control has been provided heretofore by means of cooling coils immersed in the liquid within each tank or by means of cooling jackets in thermal contact with the tank shell. Internal coils, however, make it difficult to clean the tanks, and cooling jackets are limited to refrigerants which do not significantly attack the aluminum shell. Cooling jackets, moreover, cannot readily be mounted on tank shells provided with reinforcing hoops or rings, because of the limited exposed shell surface.

The object of the invention is the provision of a hoop reinforced storage and fermentation tank for beer which can be cooled efficiently and conveniently.

Another object is the provision of a tank of the type referred to which may be made of aluminum, yet permits the use of refrigerants which attack aluminum.

With these and other objects in view, the invention mainly resides in a tank whose shell is adapted to contain beer and the like and is equipped with a plurality of reinforcing hoops spaced from each other in the direction of the tank axis. Each hoop extends circumferentially about the shell of the tank and defines a circumferentially elongated duct therein, so that refrigerant may be passed through the duct.

Other features and many advantages of the invention will be readily apparent from the following detailed description of a preferred embodiment when considered with the appended drawing in which.

Figure 4:
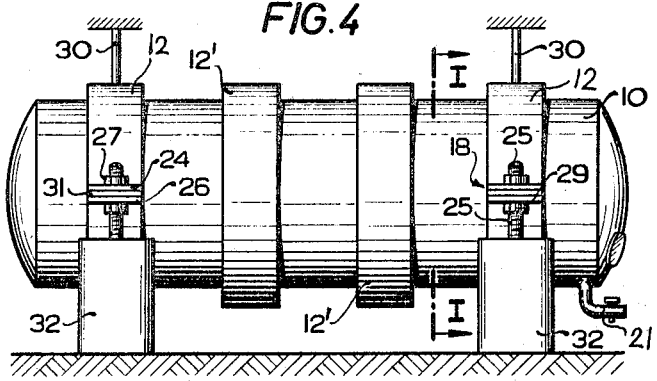
FIG. 4 illustrates the tank of FIG. 1 in side elevation.

Referring to the drawing in detail, there is seen a cylindrical aluminum shell 10 axially closed by dished bottoms in a conventional manner. The shell 10 whose axis is horizontal will be understood to be equipped with a non-illustrated feed nipple, and has a drain valve 21 (FIG. 4).

Four rigid reinforcing rings or hoops 12, 12' circle the shell 10 at uniform axial distances. The hoops 12 near the ends of the shell 10 are split along a horizontal diameter into two sections 20, 22 which are joined by flanged connections 16, 18. Each ring section consists mainly of a steel channel bent into a semicircle. The web portion 33 of the channel conformingly engages the outer surface of the shell 10. The two flange portions 35 are axially spaced from each other and radially project from the web portion 33. A steel partition 36 is sealingly interposed between the flange portions 35 at a radial distance from the web portion 33 so that the channel and the partition 36 enclose a duct 14 which is normally filled with refrigerant.

Figure 2:
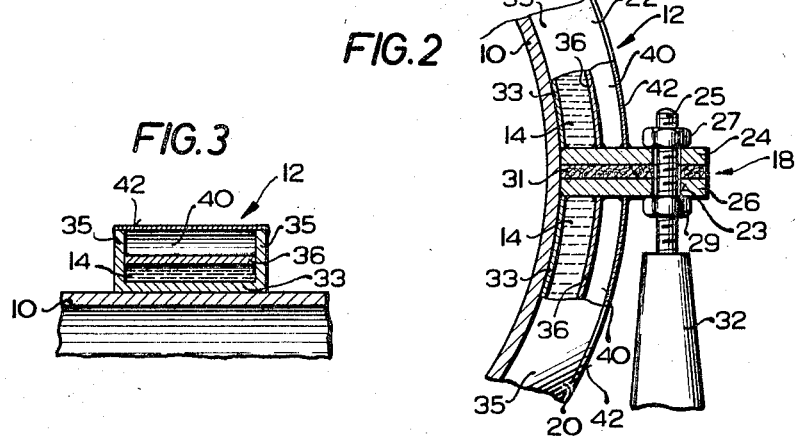
FIG. 2 illustrates a detail of FIG. 1 on a larger scale, a portion of the device being broken away to reveal internal features.

The duct 14 in each section 20, 22 is circumferentially closed by flanges 24, 26 which are welded to the channels. A resilient spacer 31 is interposed between each pair of adjacent flanges 24, 26 of the two hoop sections as best seen in FIG. 2. A stud bolt 25 fastened in a concrete column 32 passes through aligned openings 23 in one pair of flanges 24, 26. The flanges are pressed against the spacer 31 from opposite sides by nuts 27, 29 on the stud bolt 25, and thus form the aforementioned flanged connection 18.

Similar nuts urge the two flanges 24, 26 of the connection 16 against the interposed spacer 31 whereby the web portions 33 of the two hoop sections 20, 22 are held in close mechanical and thermal contact with the shell 10. The nuts associated with the flanged connection 16 threadedly engage a heavy eye bolt 28 which is engaged by a hook 30 fixedly fastened in a supporting ceiling structure. The stud bolt 25 and the eye bolt 28 thus attach the tank to the building in which the tank is arranged, and fasten the hoops 12 to the shell 10.

Figure 1:
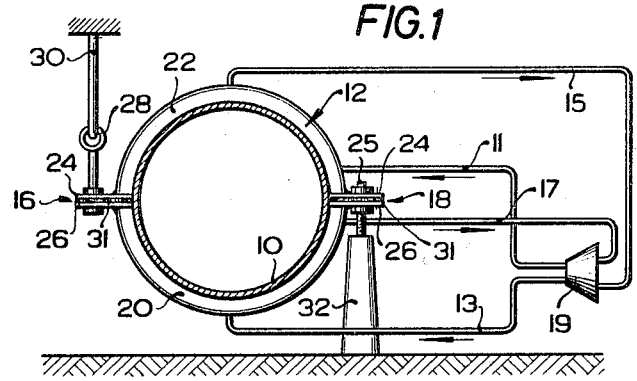
FIG. 1 shows a tank of the invention in front-elevational section on the line I—I in FIG. 4, and an associated refrigeration system in conventional representation.

As diagrammatically indicated in FIG. 1, the hoop sections 20, 22 are connected with a conventional refrigeration unit 19 consisting of a compressor and a condenser in which a refrigerant such as Freon 12 is liquefied. The volatile liquid is fed through supply lines 11, 13 to the lowermost parts of the ducts 14 in the hoop sections 22, 20 respectively, and the released gaseous refrigerant is returned to the unit 19 through discharge lines 15, 17 which communicate with the topmost portions of the two ducts 14.

In order to minimize unnecessary evaporation of the refrigerant, a cover 42 connects the free edges of the flange portions 35, thereby providing an insulating air space 40 which envelops the partition 36.

Figure 3:
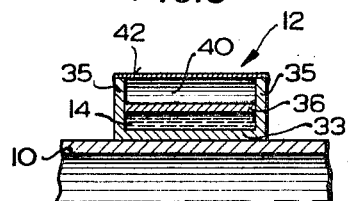
FIG. 3 shows a detail of the tank in side-elevational axial section on the scale of FIG. 2.

The two hoops 12', not illustrated in detail, consist of circular steel channels whose open side is covered in a manner analogous to the hoops 12, and evident from FIG. 3. If so desired, the hoops 12' may be replaced by hoops 12 to provide more uniform support for the shell 10 and a larger heat transmitting surface.

The tank of the invention may safely be made of aluminum, yet its contents may be cooled by means of refrigerants which strongly attack aluminum such as the fluorinated hydrocarbons of which Freon 12 is a typical representative. The refrigerant is entirely enclosed in steel conduits which are not readily attacked thereby, and which provide reinforcement for the shell 10, and means for attaching the shell to the supporting building. The four-point support provided by the paired stud bolts 25 and eyebolts 28 permits convenient leveling of the tank or other adjustments of its position.

The split rings 12 with their correspondingly divided ducts 14 provide very effective cooling of the tank contents. While rings divided into two sections have been found adequate under the conditions under which the tanks of the invention have been used so far, it will be appreciated that rings divided into more than two cooling zones will provide more intensive refrigeration if needed. A larger number of cooling zones also permits a wider range of temperature control for tanks which are to be used for different operations at different times.

The divided ducts 14 of the rings 12 make it possible to establish vertical temperature gradients in the tank, and thereby to promote convection currents in the tank contents. The conventional control valves to be provided in the lines 11, 13, 15, 17 for this purpose will be obvious to those skilled in the art. It has been found that yeast can be distributed quite evenly in the fermenting liquid by such convection currents. If the shell 10 is only partly filled with beer or fermenting liquid, thermal losses in the refrigeration system can be reduced without significant loss of effective refrigeration by supplying only the lower hoop sections 20 with refrigerant.

It should be understood, of course, that the foregoing disclosure relates only to a preferred embodiment of the invention, and that it is intended to cover all changes and modifications of the example of the invention chosen for the purpose of the disclosure which do not constitute departures from the spirit and scope of the invention set forth in the appended claims.

What I claim is:

1. A reinforced tank comprising in combination, a tank shell adapted to contain beer and the like, said shell having an axis, a plurality of axially spaced reinforcing hoops on said shell, each hoop extending circumferentially about said shell in a closed circle and defining a circumferentially elongated duct therein, said hoop being more rigid than said shell, and connecting means for connecting said duct to a source of refrigerant, said hoop including a rigid metal channel member of a U-shaped cross-section having a web portion contiguously adjacent said shell and two axially spaced flange portions radially projecting from said web portion, and a circumferentially extending partition member interposed between said flange portions and spaced from said web portion, said flange portions and said web portion and said partition member defining said duct.

2. A tank as set forth in claim 1, wherein said duct has two vertically spaced communicating parts, said refrigerant source connecting means communicating with the lower one of said two parts, and discharge means communicating with the higher one of said two parts for releasing evaporated refrigerant from said duct.

3. A reinforced tank comprising in combination, a tank shell adapted to contain beer and the like, said shell having an axis, a plurality of axially spaced reinforcing hoops on said shell, each hoop extending circumferentially about said shell in a closed circle and defining a circumferentially elongated duct therein, said hoop being more rigid than said shell, and connecting means for connecting said duct to a source of refrigerant, said hoop being constituted by a plurality of circumferential sections, each section including a channel member having a web portion in thermal contact with said shell and two axially spaced flange portions radially projecting from said web portion, and a circumferentially extending partition member interposed between said flange portions and radially spaced from said web portion, said channel member and said partition member defining respective portions of said duct in each of said sections, flanges on the terminal portion of each channel member, each flange constituting a circumferential end wall of the respective duct portion, fastening means securing each flange to a flange on another section of said hoop and constituting a flanged connection with the fastened flanges, and attaching means secured to two circumferentially spaced flanged connections for attaching said shell to a support.

4. A tank as set forth in claim 3, each of said portions of said ducts having two vertically spaced parts, said hoop further including feed means for feeding a volatile liquid refrigerant to the lower one of said two parts, and discharge means communicating with the higher one of said two parts for discharge of evaporated refrigerant therefrom.

5. A tank as set forth in claim 4, wherein said axis is substantially horizontal, and said shell is substantially cylindrical about said axis and of aluminum, said channel member being of ferrous metal.

References Cited

UNITED STATES PATENTS

| | | | |
|---|---|---|---|
| 2,030,005 | 2/1936 | Kellogg | 62—394 X |
| 2,074,365 | 3/1937 | Clifford | 62—394 X |
| 2,183,509 | 12/1939 | Smith | 62—394 |
| 2,625,804 | 1/1953 | Patch et al. | 62—395 X |

LLOYD L. KING, *Primary Examiner.*